United States Patent
Plohberger et al.

(10) Patent No.: US 6,766,786 B2
(45) Date of Patent: Jul. 27, 2004

(54) ARRANGEMENT FOR REGULATING A SPARK-IGNITION INTERNAL COMBUSTION ENGINE

(75) Inventors: Diethard Plohberger, Jenbach (AT); Dieter Chvatal, Jenbach (AT)

(73) Assignee: Jenbacher Aktiengesellschaft, Jenbach (AT)

(*) Notice: Subject to any disclaimer, the term of this patent is extended or adjusted under 35 U.S.C. 154(b) by 156 days.

(21) Appl. No.: 10/052,066

(22) Filed: Jan. 18, 2002

(65) Prior Publication Data

US 2002/0092498 A1 Jul. 18, 2002

(30) Foreign Application Priority Data

Jan. 18, 2001 (AU) .............................................. 84/2001

(51) Int. Cl.[7] .............................................. F02P 5/00
(52) U.S. Cl. .............................. 123/406.29; 123/406.44
(58) Field of Search ........................ 123/406.29, 406.44, 123/406.19, 406.25

(56) References Cited

U.S. PATENT DOCUMENTS

| | | | |
|---|---|---|---|
| 4,268,910 A | 5/1981 | Omori et al. ............... | 364/431 |
| 4,844,034 A | 7/1989 | Honjo et al. ................ | 123/424 |
| 4,915,076 A | * 4/1990 | Takizawa ................ | 123/406.19 |
| 5,070,839 A | * 12/1991 | Okuda .................... | 123/406.29 |
| 5,575,257 A | 11/1996 | Lange et al. ................ | 123/337 |
| 5,588,411 A | 12/1996 | Kreuter et al. .............. | 123/418 |
| 5,992,385 A | 11/1999 | Hess et al. ............. | 123/406.23 |
| 6,371,082 B1 | * 4/2002 | Spaulding .............. | 123/406.44 |

FOREIGN PATENT DOCUMENTS

| | | |
|---|---|---|
| DE | 3642773 A1 | 2/1987 |
| DE | 3917905 A1 | 6/1990 |
| DE | 3918683 A1 | 9/1990 |
| DE | 3940752 A1 | 6/1991 |
| DE | 35 39 168 C2 | 6/1994 |
| WO | WO 88/08486 | 11/1988 |
| WO | WO 97/21029 | 6/1997 |

* cited by examiner

Primary Examiner—Bibhu Mohanty
(74) Attorney, Agent, or Firm—Lorusso Loud & Kelly LLP

(57) ABSTRACT

An arrangement for regulating a spark-ignition internal combustion engine, in particular a stationary boosted gas Otto-cycle engine, comprising a power regulating device acting on at least one power setting member, wherein an ignition time regulating device (8, 9, 10) adjusts the ignition time (ZZP) in dependence on the position of the power setting member (2).

10 Claims, 3 Drawing Sheets

ARRANGEMENT FOR REGULATING A SPARK-IGNITION INTERNAL COMBUSTION ENGINE

BACKGROUND OF THE INVENTION

The invention concerns an arrangement for regulating a spark-ignition internal combustion engine, in particular a stationary boosted gas Otto-cycle engine, comprising a power regulating device acting on at least one power setting member.

An arrangement of that kind is known for example from European patent EP 0 259 382. There, the mixture pressure which prevails upstream of the inlet valves of the internal combustion engine is used as a regulating parameter in order finally to regulate the combustion gas-air ratio. That is directly correlated to the proportions of $NO_x$ in the exhaust gas, so that overall this involves an emission regulator in the form of a lambda regulator. The target parameters of that known engine regulating system are therefore power and nitrogen oxide emission $NO_x$. In order to achieve the regulating target the boost pressure and the combustion gas-air ratio lambda are altered. Power and nitrogen oxide emission are coupled to all engine parameters so that the power and emission regulator is generally intercoupled regulators.

Admittedly, such a known regulation strategy makes it possible to regulate the nitrogen oxide emissions to a predetermined value and to hold the power at the desired value. It is however not possible with the known regulation strategy always to implement ongoing optimisation of the level of efficiency because the optimum operating point depends on environmental conditions such as induction temperature, altitude of installation and the quality of fuel gas.

SUMMARY OF THE INVENTION

Therefore the object of the present invention is to provide an improved arrangement for regulating a spark-ignition internal combustion engine of the general kind set forth in the opening part of this specification, with which it is always possible to hold an operating point which is the optimum in terms of level of efficiency, even with a fluctuating fuel gas quality and fluctuating environmental conditions. It will be appreciated that in that respect preferably the regulating properties which are already previously known, in regard to a given power and a given (constant) emission of pollutants, in particular $NO_x$, are to be maintained.

In accordance with the invention that is achieved in that there is provided an ignition time regulating device which adjusts the ignition time in dependence on the position of the power setting member. In the case of boosted gas Otto-cycle turbocharged engines the ignition time represents a further engine parameter which permits a variation in the attainable full load by later setting of that time. That makes it possible to implement a regulation function which at any time guarantees a minimum regulation reserve by varying the ignition time. In that way it is possible always to operate at the internal combustion engine operating point which is optimum in terms of the level of efficiency, without running the risk of no longer attaining the required emission values or the required power output in the event of fluctuating environmental conditions or fluctuating fuel gas qualities.

For that purpose it can preferably be provided that the ignition time regulating device has at the input side a threshold value device which limits the ignition time adjustment to positions of the power setting member which are above a pre-settable value and the highest power value of the power setting member. Ignition time regulation therefore remains inactive until the power setting member, for example a blow-off valve in a turbobypass or the throttle flap is just at the position corresponding to maximum power. When the power setting member has reached a predetermined position, for example the blow-off valve is throttled down to 20% of a passage (and the throttle flap is already completely opened), ignition time regulation intervenes by setting the ignition time to later whereby power rises. Then, in regard to the actual power setting member, a regulation reserve is still available, which makes it possible to intervene rapidly in terms of engine power output in the event of fluctuating conditions so that the engine can always maintain its power. The power setting member can do that rapidly in terms of time while ignition time regulation requires only a longer response time. It affords in practice the power reserve for the actual power setting member so that it is always possible to operate at the optimum operating point at the power limit, without having to run the risk of no longer attaining the engine power output, under adverse external conditions.

In addition, by way of incorporating the ignition time into the regulating system, it is possible to prevent the knock or detonation limit from being exceeded. It is therefore also possible to cautiously approach the knock or detonation limit. For that purpose it is preferably provided that the ignition time regulating device has an output signal limiter which ensures that the ignition time is at any event adjustable only between two pre-settable limits in the late direction, and in the early direction, in which respect there is provided a knock regulator which on the input side has at least one knock sensor on the internal combustion engine and which is connected on the output side to the output signal limiter and which when knocking combustion occurs reduces the effective limit for adjustment of the ignition time in the direction early until knocking combustion no longer occurs.

As mentioned in the opening part of this specification, it is already known that it is possible to regulate the combustion gas-air ratio and therewith the levels of pollutant emission ($NO_x$) by way of regulation of the boost pressure in dependence on the parameters consisting of engine power and mixture temperature upstream of the inlet valves. The relationship between the emission reference value or the reference value for the combustion gas-air ratio lambda on the one hand and the boost pressure on the other hand is dependent on ignition time. For that reason, a preferred embodiment provides that this emission regulation also involves the ignition time as a parameter which varies. A preferred embodiment is characterised in that the lambda regulator receives at the actual value input an actual value signal corresponding to the mixture pressure upstream of the valves of the internal combustion engine and at the reference value input there is a reference value signal which is calculated in dependence on a pre-settable reference value for the amount of $NO_x$ contained in the exhaust gases and in dependence on the currently detected values in respect of engine power output, the mixture temperature upstream of the valves and the current ignition time.

BRIEF DESCRIPTION OF THE DRAWING

Further advantages and details of the invention are described more fully with reference to the specific description hereinafter.

DETAILED DESCRIPTION OF THE INVENTION

Figure 1:
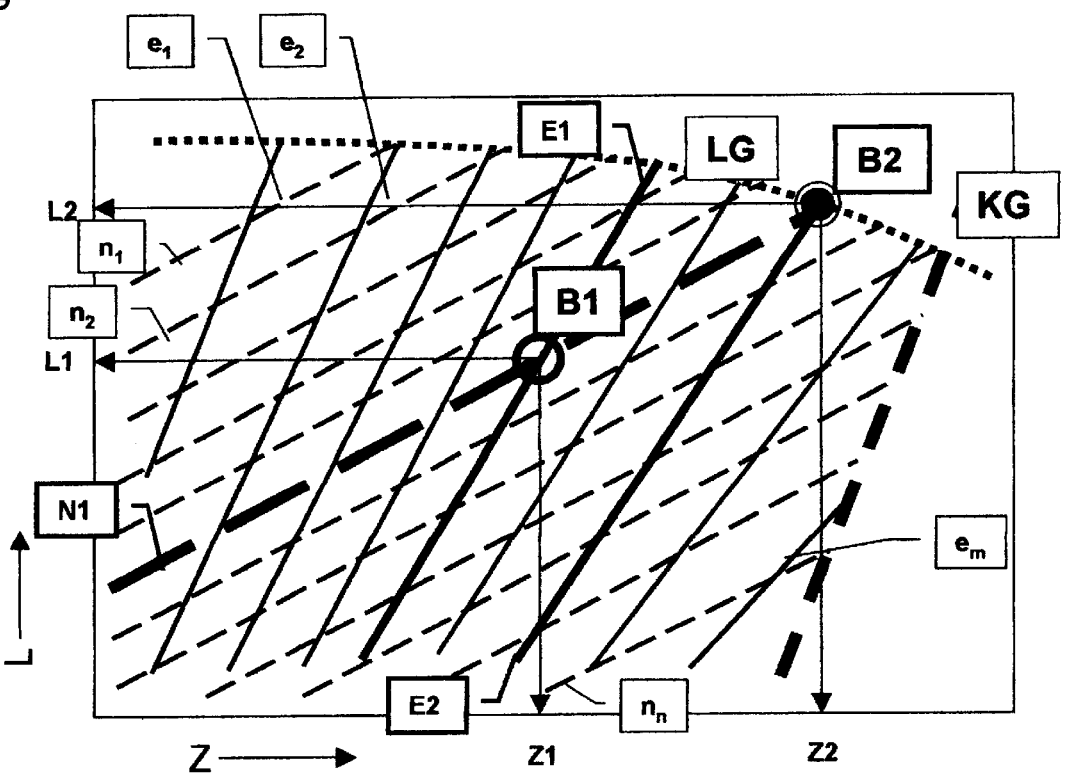
FIGS. 1, 2 and 3 each show schematic diagrams, wherein the ignition time Z is plotted on the X-axis while the combustion gas-air ratio L is plotted on the Y-axis. The diagrams therefore represent a lambda ignition time performance graph with a constant engine load.

In the embodiment shown in FIG. 1 the lines $n_1$ are those lines along which the operating point of the engine is such that the nitrogen emission $NO_x$ is constant. Each operating point on such a line and in particular on the more heavily illustrated line N1 involves the same $NO_x$ emission value.

The lines $e_1$ are the lines of constant efficiency. The level of efficiency of the internal combustion engine is constant along those lines, while the lines which are further at the right in FIG. 1 involve a higher level of efficiency.

The operating point B1 is on the line N1 and the line E1. It therefore affords the required nitrogen emission but it does not involve an entirely optimum level of efficiency.

The regulating algorithm which is described hereinafter with reference to FIG. 4 now goes to the point on the emission line N1 which is furthest to the right in FIG. 1, namely the point B2. In that respect it is to be observed that the possible operating points are limited by the power limit LG (broken line) and the knock or detonation limit (KG) which extends inclinedly downwardly at the right (thick broken line). In FIG. 1 therefore the point B2 is at the power limit. It has the best level of efficiency E2 with the required nitrogen emission N1.

The possible operating line is therefore delimited on the one hand by the fuel gas-dependent knock limit KG and on the other hand by the power limit LG which is dependent on the environmental conditions such as induction temperature, altitude and exhaust gas back pressure. Those limits therefore vary in dependence on external conditions.

Figure 2:
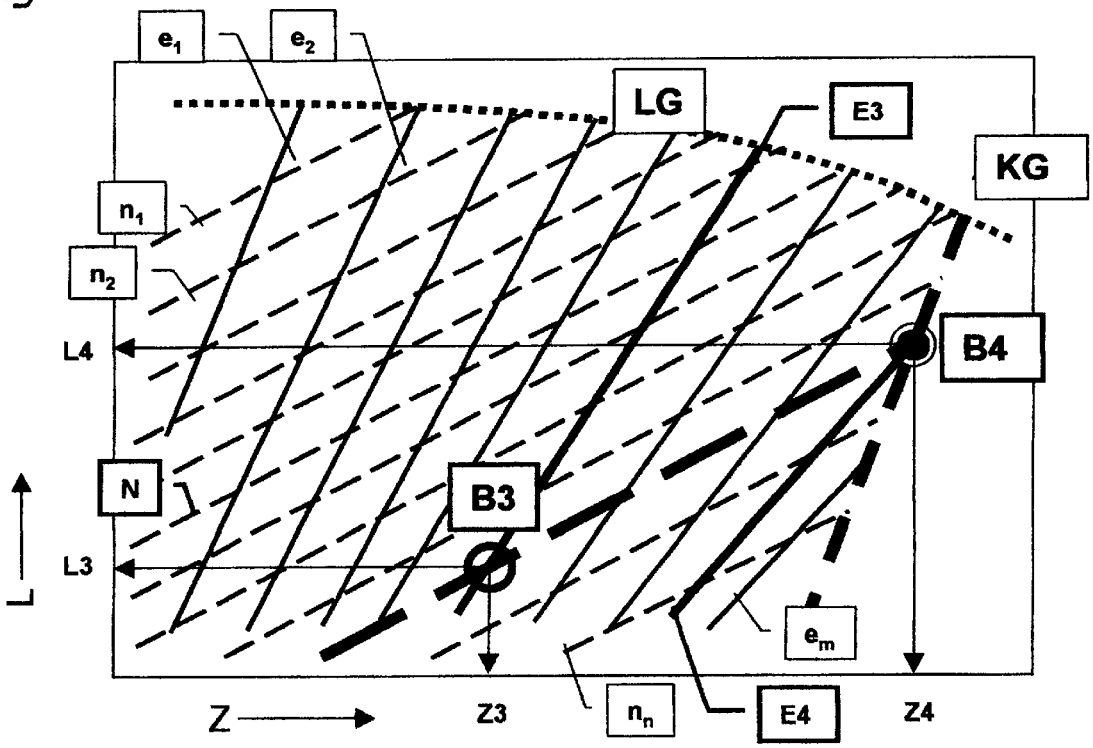

In this respect the situation shown in FIG. 2 for example can occur, in which the level of efficiency is at its most optimum at the operating point B4 at the knock limit and not at the power limit, as in FIG. 1. The efficiency of that operating point B4 is on the line E4 and is therefore substantially higher than the level of efficiency of an operating point B3 which is disposed with a safety margin from the power limit LG and the knock limit KG and which was maintained in the case of regulating systems in the state of the art.

Figure 3:
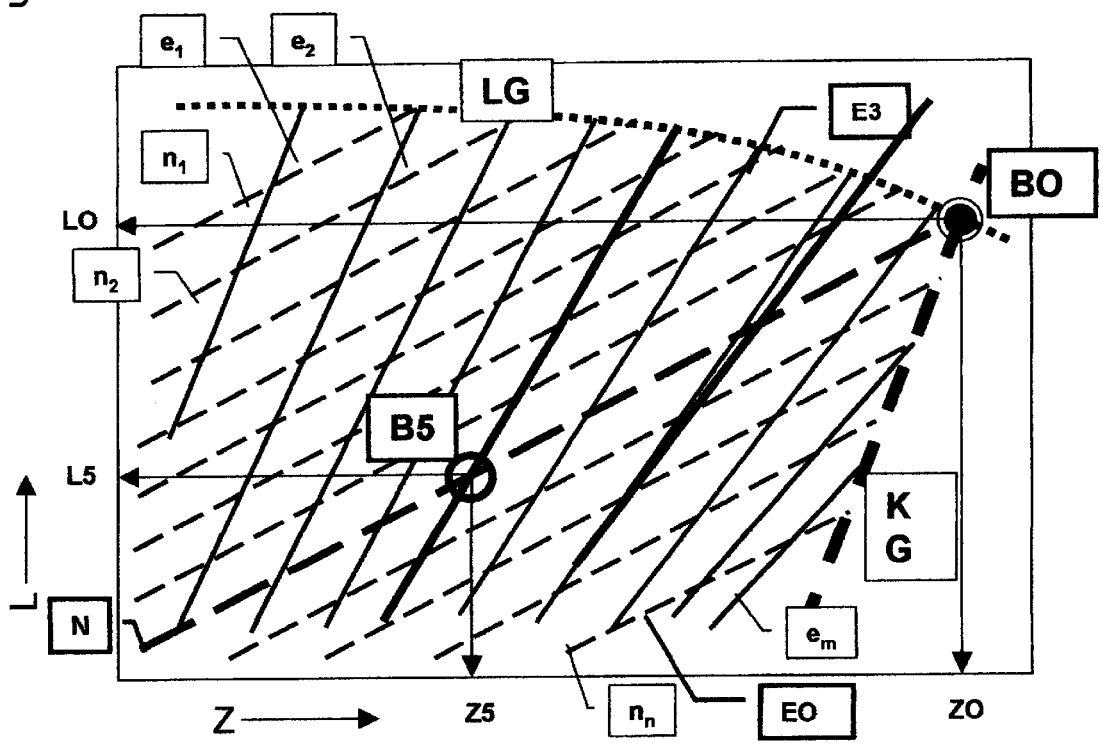

Referring to FIG. 3, here there are environmental and fuel gas conditions which make it possible to approach the most optimum possible operating point BO. It is on the point of intersection of the power limit and the knock limit and is thus substantially better in terms of efficiency than a usual operating point B5 which has the same nitrogen emission $NO_x$.

Figure 4:
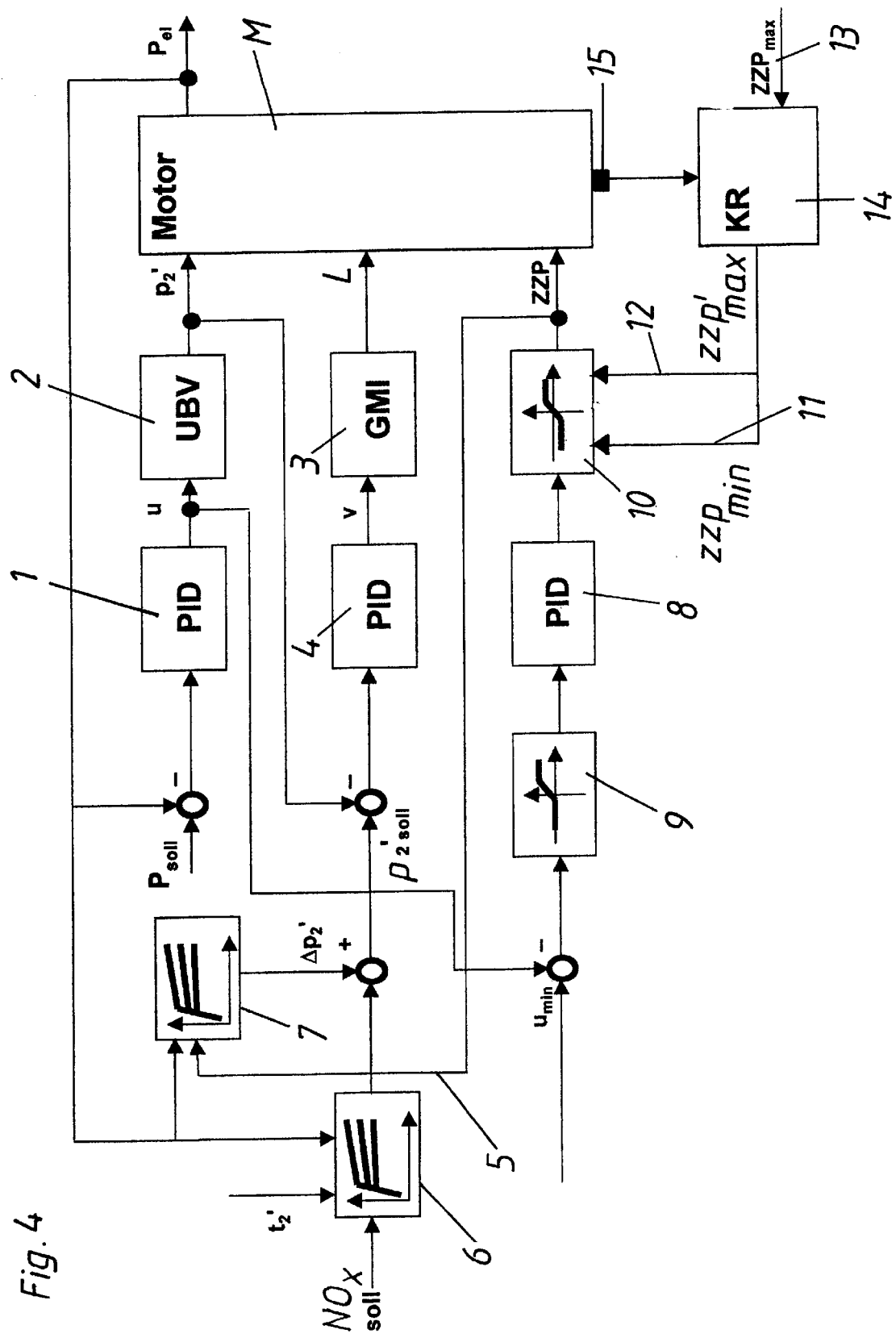
FIG. 4 diagrammatically illustrates an embodiment of the arrangement according to the invention.

An arrangement according to the invention which is capable of approaching, in the diagrams shown in FIGS. 1 through 3 on the line of constant nitrogen oxide emission, that point which is at earlier ignition times (at the right in FIGS. 1 through 3) and higher lambda values (at the top in FIGS. 1 through 3) is shown in FIG. 4. This arrangement also ensures that the knock limit is not exceeded and that at the power limit it is always still possible to achieve a rapid regulation reserve for regulation of the engine power output upon a variation in external conditions.

The engine components in FIG. 4 and in particular the turbocharger belong to the state of the art and are not shown in greater detail here. In that respect attention is directed to prior patents EP 0 259 382 or EP 0 757 169.

In FIG. 4 reference M denotes an internal combustion engine, in particular a stationary gas Otto-cycle engine, which is boosted by a turbocharger. A power regulating device 1 ensures by way of a high-speed PID-regulator, by way of the setting signal u, that the engine power $P_{al}$ is regulated to the reference or target value $P_{soll}$.

The mixture pressure $P_2'$ prevails upstream of the inlet valves of the engine. Approximately at the center of FIG. 4 is the regulating device for the combustion gas-air ratio lambda (L). The setting member is a gas mixer 3 (GMI) which is actuated by a PID regulator 4 by way of the setting parameter V. Lambda regulation is effected by way of regulation of the boost pressure upstream of the valves, namely the pressure $P_{2'}$. The reference value $P_{2'soll}$ is calculated on the one hand in known manner in dependence on the desired nitrogen oxide emissions $NO_{xsoll}$ and the mixture temperature $t_{2'}$ upstream of the inlet valves and on the other hand in dependence on the engine power output $P_{al}$, from performance graphs. In that respect lambda regulation is state of the art and corresponds to EP 0 259 382 or the engine types produced by the applicants. What is new is the fact that the ignition time ZZP is also incorporated by way of calculation of the reference or target value $P_{2'soll}$, more specifically by way of the line 5. Therefore the two performance graphs 6 ($NO_{xsoll}$ and $P_{2'}$) and 7 ($P_{al}$ and ZZP) are taken into consideration when calculating the mixture pressure reference value $P_{2'soll}$. Overall those last-described components ensure that the operating point of the engine is always on a straight line of constant $NO_x$ emission, that is to say for example the straight line N1 or N in FIGS. 1 through 3, while the power regulating device described hereinbefore with reference to FIG. 4 sets the desired engine power output.

Now, disposed at the bottom in FIG. 4 is the ignition timing regulating device according to the invention which includes a PID regulator 8, a threshold value device 9 and an output signal limiter 10.

The threshold value device 9 ensures that the ignition time adjustment in the direction late, that is to say in the direction of increased engine power, occurs only when the power setting member 2 is already close to its full-load position, that is to say when the arrangement involves a valve in the by-pass blow-off line, that valve is almost closed. The response value $U_{min}$ is adjustable in that case. If the power setting member passes into that range, there is the danger that there is not a sufficient regulation reserve for rapidly controllingly regulating the engine power. In that case therefore the PID regulator sets the ignition time ZZP in the direction late. In the case of a boosted gas Otto-cycle engine that results in the desired increase in power, without the necessity for the power setting member to meet the stop. There is therefore always still a regulation reserve available. The latest ignition time $ZZP_{min}$ which is typical of the engine can be set in that case by way of the input 11 at the output signal limiter 10. The value $ZZP_{max}$, which is supplied by way of the line 12 is in the direction of an earlier ignition time. That value is limited on the one hand by the motor-specific upper limit $ZZP_{max}$ which can be set by way of the input 13 at the knock regulator. On the other hand, that value $ZZP_{max}$ can be shifted downwardly, more specifically by the knock regulator 14, if the latter detects a knocking or detonation noise by means of knock sensors 15 which are arranged on the engine in per se known manner. The knock regulator KR, 14 therefore then reduces the pre-set ignition time $ZZP_{max}$ for the earliest possible ignition time, to the current value $ZZP_{max}$. That ensures that the knock limit is not exceeded and the engine at any event runs cleanly. The nominal ignition time of the engine is set earlier or equal to $ZZP_{max}$, whereby the regulating system fundamentally endeavours to approach an early ignition time. The power reserve regulation and the knock regulator shift the current ignition time to the necessary degree in the direction 'late'.

Overall therefore the arrangement shown in FIG. 4 ensures that the engine runs at the desired nitrogen oxide emission $NO_{xsoll}$ at the desired power output $P_{soll}$ with in each case a maximum possible level of efficiency, wherein for the purposes of regulating out fluctuations in power there is always a fast regulation reserve available and harmful knocking is avoided in any case.

What is claimed is:

1. A method of regulating a spark-ignition internal combustion engine comprising: providing a power regulating device acting on at least one power setting member; and adjusting the ignition timing using an ignition time regulating device in dependence on the position of the power setting member to reach the maximum level of efficiency at a given nitrogen oxide emission of the combustion engine.

2. A method as set forth in claim 1 wherein the ignition time adjustment is limited to positions of the power setting member which are above a pre-settable value in the region of the highest power value of the power setting member.

3. A method as set forth in claim 1 wherein the ignition time regulating device has an output signal limiter which ensures that the ignition time is adjustable at any event only between two pre-settable limits in the direction of later ignition time and in the direction of earlier ignition time.

4. A method as set forth in claim 3 wherein upon the occurrence of knocking combustion, the effective limit for adjustment of the ignition time is reduced in the direction of earlier ignition time until knocking combustion no longer occurs.

5. A method as set forth in claim 1 wherein the combustion engine is regulated in order to reach the maximum level of efficiency in close proximity of the power limit or the knock limit.

6. An apparatus for regulating a spark-ignition internal combustion engine comprising: a power regulating device acting on at least one power setting member; an ignition time regulating device for adjusting the ignition timing in dependence on the position of the power setting member to reach the maximum level of efficiency at a given nitrogen oxide emission of the combustion engine; and a lambda regulating device which acts on a gas mixer for regulating the fuel-air ratio.

7. The apparatus of claim 6 wherein the lambda regulating device is connected to the ignition time regulating device, wherein a signal corresponding to the current ignition time can be fed to the lambda regulating device.

8. The apparatus of claim 7 wherein the lambda regulating device receives at the actual value input, an actual value signal corresponding to the mixture pressure upstream of the valves of the internal combustion engine, and at the reference value input there is a reference value signal which is calculated in dependence on a presettable reference value for the amount of $NO_x$ contained in the exhaust gases and in dependence on the currently detected values of the engine power, the mixture temperature upstream of the valves and the current ignition time.

9. The apparatus of claim 6 wherein the engine is a stationary boosted Otto-cycle engine.

10. The apparatus of claim 6 wherein the power setting member of the power regulating device is a settable blow-off valve in a bypass duct to the turbocharger.

* * * * *